United States Patent
Prasad et al.

(10) Patent No.: US 6,735,207 B1
(45) Date of Patent: May 11, 2004

(54) APPARATUS AND METHOD FOR REDUCING QUEUING MEMORY ACCESS CYCLES USING A DISTRIBUTED QUEUE STRUCTURE

(75) Inventors: Sharat Chandra Prasad, San Jose, CA (US); Tuchih Tsai, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 09/593,736

(22) Filed: Jun. 13, 2000

(51) Int. Cl.[7] .......................... H04L 12/28; H04L 12/54
(52) U.S. Cl. ..................... 370/395.7; 370/412; 370/429
(58) Field of Search ........................... 370/395.1, 395.7, 370/412, 429, 401; 710/54, 39, 107, 130; 711/100, 169, 111, 170, 132, 168, 147, 150, 211; 365/230.08

(56) References Cited

U.S. PATENT DOCUMENTS

| | | | | |
|---|---|---|---|---|
| 4,507,760 A | | 3/1985 | Fraser | 365/221 |
| 4,949,301 A | * | 8/1990 | Joshi et al. | 364/900 |
| 5,166,930 A | | 11/1992 | Braff et al. | 370/94.1 |
| 5,212,686 A | | 5/1993 | Joy et al. | 370/60 |
| 5,224,099 A | | 6/1993 | Corbalis et al. | 370/94.2 |
| 5,268,900 A | | 12/1993 | Hluchyj et al. | 370/94.1 |
| 5,359,592 A | | 10/1994 | Corbalis et al. | 370/17 |
| 5,408,472 A | | 4/1995 | Hluchyj et al. | 370/94.1 |
| 5,502,725 A | | 3/1996 | Pohjakallio | 370/94.1 |
| 5,561,663 A | | 10/1996 | Klausmeier | 370/17 |
| 5,570,360 A | | 10/1996 | Klausmeier et al. | 370/60 |
| 5,699,521 A | | 12/1997 | Iizuka et al. | 395/200.15 |
| 5,793,978 A | | 8/1998 | Fowler | 395/200.56 |
| 5,802,047 A | | 9/1998 | Kinoshita | 370/359 |
| 5,838,915 A | | 11/1998 | Klausmeier et al. | 395/200.45 |
| 5,852,721 A | | 12/1998 | Dillon et al. | 395/200.47 |
| 5,893,162 A | | 4/1999 | Lau et al. | 711/153 |
| 5,924,098 A | | 7/1999 | Kluge | 707/100 |
| 5,926,458 A | | 7/1999 | Yin | 370/230 |
| 5,953,336 A | | 9/1999 | Moore et al. | 370/395 |
| 6,021,086 A | * | 2/2000 | Joffe | 365/230.05 |
| 6,097,724 A | * | 8/2000 | Kartalopoulos | 370/395 |

FOREIGN PATENT DOCUMENTS

WO     WO 93/07692     4/1993     H04J/3/24

OTHER PUBLICATIONS

Zhang, et al. "Rate–Controlled Static–Priority Queueing", 1993, IEEE, pp. 227–236.

* cited by examiner

Primary Examiner—Duc Ho
(74) Attorney, Agent, or Firm—Thelen Reid & Priest LLP; David B. Ritchie

(57) ABSTRACT

To reduce the number of memory access cycles required to process each data element in a data networking device having one or more queues and a corresponding set of data link structures, the queue and data link structures are implemented on separate memories. Each queue is maintained using separate receive and transmit queue structures. Similarly, the data memory linked list is separated into a data queue link and a data stack link. Each of these four memories comprises its own address and data bus, and all four memories may be accessed simultaneously by a controller. In a general case, processing a complete data transmission event (i.e., a data element arrival and a data element departure) may be performed with a latency of at most three steps. In the first step, the transmit queue is read to obtain the old head pointer.

27 Claims, 9 Drawing Sheets

APPARATUS AND METHOD FOR REDUCING QUEUING MEMORY ACCESS CYCLES USING A DISTRIBUTED QUEUE STRUCTURE

BACKGROUND OF THE INVENTION

The present invention relates to memory management and data communication networks. More particularly, the present invention relates to an apparatus and method for reducing the required number of queuing memory access cycles using a distributed queue structure in devices such as data communication network devices having multiple queues.

As is known to those of ordinary skill in the art, a network is a communication system that allows users to access resources on other computers and, exchange messages with other users. A network is typically a data communication system that links two or more computers and peripheral devices. It allows users to share resources on their own systems with other network users and to access information on centrally located systems or systems that are located at remote offices. It may provide connections to the Internet or the networks of other organizations. The network typically includes a cable that attaches to network interface cards ("NICs") in each of the devices within the network. Users may interact with network-enabled software applications to make a network request (such as to get a file or print on a network printer). The application may also communicate with the network software, which may then interact with the network hardware to transmit information to other devices attached to the network.

Many techniques and devices are known to those of ordinary skill in the art for transmitting data between nodes in a network. For example, data may be transmitted through multiple intermediate network connection devices, such as routers and switches, located between a source node and a destination node. These intermediate network communication devices may contain one or more queues that temporarily store data awaiting transmission to another node or network communication device in the network. In networks that transmit data using an Internet Protocol ("IP"), best-effort service is typically provided by the various network nodes. Best-effort service does not provide any Quality of Service ("QOS") guarantees for a particular data stream. Instead, best-effort service transmits data in the order it was received using a network communication device's available bandwidth.

Network communication devices that support QOS or other resource allocation techniques typically use multiple queues in which each queue is associated with a particular QOS or a particular data flow. A portion of the device's resources, such as bandwidth, are allocated to a particular queue within the device.

FIG. 1 is a block diagram illustrating an exemplary network 100 connecting a user 110 and a particular web page 120. FIG. 1 is an example that may be consistent with any type of network known to those of ordinary skill in the art, including a Local Area Network ("LAN"), a Wide Area Network ("WAN"), or a combination of networks, such as the Internet.

When a user 110 connects to a particular destination, such as a requested web page 120, the connection from the user 110 to the web page 120 is typically routed through several internetworking devices such as routers 130-A–130-I. Routers are typically used to connect similar and heterogeneous network segments into internetworks. For example, two LANs may be connected across a dial-up, integrated services digital network ("ISDN"), or across a leased line via routers. Routers may also be found throughout internetwork known as the Internet. End users may connect to a local Internet service provider ("ISP") (not shown).

As shown in FIG. 1, multiple routes are possible to transmit information between user 110 and web page 120. Networks are designed such that routers attempt to select the best route between computers such as the computer where user 110 is located and the computer where web page 120 is stored. For example, based on a number of factors known to those of ordinary skill in the art, the route defined by following routers 130-A, 130-B, 130-C, and 130-D may be selected. However, the use of different routing algorithms may result in the selection of the route defined by routers 130-A, 130-E, 130-F, and 130-G, or possibly even the route defined by routers 130-A, 130-B, 130-H, 130-I, 130-F, and 130-G. A detailed discussion of the aspects of routing algorithms that determine the optimal path between two nodes on a network is not necessary for the purposes of the present invention, and such a discussion is not provided here so as not to overcomplicate the present disclosure.

Routers such as routers 130-A–130-I typically transfer information along data communication networks using formatted data packets. For example, when a "source" computer system (e.g., computer 110 in FIG. 1) wishes to transmit information to a "destination" computer system (e.g., computer 120 in FIG. 1), it generates a packet header in an appropriate format which typically includes the address of the source and destination end system, and then fills the remainder of the packet with the information to be transmitted. The complete data packet is then transmitted to the router attached to (and responsible for) the source computer system, which forwards it toward the destination computer system. Packets transmitted among the routers themselves (typically referred to as "control packets") are similarly formatted and forwarded.

When a router receives a data packet, it reads the data packet's destination address from the data packet header, and then transmits the data packet on the link leading most directly to the data packet's destination. Along the path from source to destination, a data packet may be transmitted along several links and pass through several routers, with each router on the path reading the data packet header and then forwarding the data packet on to the next "hop."

To determine how data packets should be forwarded, each router is typically aware of the locations of the network's end systems (i.e., which routers are responsible for which end systems), the nature of the connections between the routers, and the states (e.g., operative or inoperative) of the links forming those connections. Using this information, each router can compute effective routes through the network and avoid, for example, faulty links or routers. A procedure for performing these tasks is generally known as a "routing algorithm."

FIG. 2 is a block diagram of a sample router 130 suitable for implementing an embodiment of the present invention. For the purpose of explanation, the present invention is described as embodied in a router. However, those of ordinary skill in the art will recognize that various other network communication devices such as switches (including asynchronous transfer mode (ATM) switches and IP switches), data servers, and similar devices may embody the teachings of the present invention. In a particular embodiment of the invention, router 130 is an Internet Protocol ("IP") router. However, those of ordinary skill in the art will recognize that the present invention can be used with various other protocols.

Referring to FIG. 2, router 130 is shown to include a master control processing unit ("CPU") 210, low and medium speed interfaces 220, and high speed interfaces 230. The CPU 210 may be responsible for performing such router tasks as routing table computations and network management. It may include one or more microprocessor integrated circuits selected from complex instruction set computer ("CISC") integrated circuits, reduced instruction set computer ("RISC") integrated circuits, or other commercially available processor integrated circuits. Non-volatile RAM and/or ROM may also form a part of CPU 210. Those of ordinary skill in the art will recognize that there are many alternative ways in which such memory can be coupled to the system.

Interfaces 220 and 230 are typically provided as interface cards. Generally, they control the transmission and reception of data packets over the network, and sometimes support other peripherals used with router 130. Throughout the description of this invention, the term "data packet" shall be understood to include any grouping of one or more data elements of any size, including data cells, data bytes, and the like. In a particular embodiment of the invention, router 130 is an IP router capable of handling IP data packets. In this embodiment, IP data packets associated with different IP data flows are buffered in different queues. This buffering of IP data packets can be performed on a per service class basis or a per data flow basis.

Examples of interfaces that may be included in the low and medium speed interfaces 220 are a multiport communications interface 222, a serial communications interface 224, and a token ring interface 226. Examples of interfaces that may be included in the high speed interfaces 230 include a fiber distributed data interface ("FDDI") 232 and a multiport Ethernet interface 234. Each of these interfaces (low/medium and high speed) may include (1) a plurality of ports appropriate for communication with the appropriate media, and (2) an independent processor, and in some instances (3) volatile RAM. The independent processors may control such communication intensive tasks as packet switching and filtering, and media control and management. By providing separate processors for the communication intensive tasks, this architecture permits the master CPU 210 to efficiently perform routing computations, network diagnostics, security functions, and other similar functions.

The low and medium speed interfaces are shown to be coupled to the master CPU 210 through a data, control, and address bus 240. High speed interfaces 230 are shown to be connected to the bus 240 through a fast data, control, and address bus 250, which is in turn connected to a bus controller 260. The bus controller functions are typically provided by an independent processor.

Although the system shown in FIG. 2 is an example of a router suitable for implementing an embodiment of the present invention, it is by no means the only router architecture on which the present invention can be implemented. For example, an architecture having a single processor that handles communications as well as routing computations would also be acceptable. Further, other types of interfaces and media known to those of ordinary skill in the art could also be used with the router.

At a higher level of abstraction, FIG. 3 is a block diagram illustrating a model of a typical router system that is applicable in the context of the present invention. As shown in FIG. 3, a networking device such as a router 130 may be modeled as a device having a plurality of input interfaces 310$a$–310$n$, each having a corresponding input interface queue 320$a$–320$n$. Each input interface 310 receives a stream 330$a$–330$n$ of data packets 340$a$–340$z$, with each data packet 340 typically arriving at a variable rate and typically having a variable length (usually measured in bytes). In addition to the data "payload" in each packet, each packet contains header information, which typically includes a source address and a destination address. Currently, the dominant protocol for transmitting such data packets is the Internet Protocol ("IP"). However, as will be described more fully in subsequent portions of this document, embodiments of the present invention can be implemented using any routable protocol known to those of ordinary skill in the art.

As each new data packet 340 arrives on an interface 310$k$, it is written into a corresponding input interface queue 320$k$, waiting for its turn to be processed. Scheduling logic 350 determines the order in which input interfaces 310$a$–310$n$ should be "polled" to find out how many data packets (or equivalently, how many bytes of data) have arrived on a given interface 310$k$ since the last time that interface 310$k$ was polled. Scheduling logic 350 also determines the amount of data that should be processed from a given interface 310$k$ during each "polling round." When scheduling logic 350 determines that a particular data packet 340$i$ should be processed from a particular input interface queue 320$k$, scheduling logic 350 transfers the data packet 340$i$ to subsequent portions of the networking device (shown as dashed block 355) for further processing. Eventually, data packet 340$i$ is written into one of a plurality of output queues 360$a$–360$q$, at the output of which the data packet 340$i$ is finally transmitted from the networking device the corresponding output interface 370$a$–370$q$. Fundamentally, then, the packet forwarding component of a router performs the function of examining the source and destination address of each data packet and identifying one from among a plurality of output interfaces 370$a$–370$q$ on which to transmit each data packet.

In the router model illustrated in FIG. 3, each queue is associated with one of the router's input or output interface ports. However, as mentioned earlier, it is also possible to associate a queue with a particular "session," with a "flow," or with any other category or classification of data stream. In the context of the present invention, therefore, a "queue" is simply an ordered list of elements waiting to be processed. A "flow" is a stream of data traveling between two endpoints across a network (for example, from one LAN station to another). Multiple flows can be transmitted on a single circuit. As those of ordinary skill in the art will recognize, the number of queues in a network device can be very large in implementations where each flow can be associated with a queue.

In a queuing control design realized by a hardware memory structure, the number of memory accesses to the queue within a certain amount time is limited by the bandwidth of the memory. Typically, updating a queuing event such as the arrival or departure of a queue data element requires two memory access cycles: one to read the current status and one to write the updated values. In such a configuration, completing the service of a queuing event (i.e., the arrival and departure of a data element) requires four memory access cycles. Such service time requirements limit the throughput of the queue. If the data arrival rate is faster than the total queue service time, the queue will overflow.

As mentioned earlier, in networking design, it is often necessary to implement a large number of queues on shared memories for high-speed data processing. Reducing the number of queue access cycles—and, hence, the queue service time—while maintaining the queuing functions is critical to achieving desired performance.

A typical memory architecture 400 for a network device employing multiple queues is illustrated in FIG. 4. As shown in FIG. 4, controller 405 may be a microprocessor, a microcontroller, or any other suitable equivalent device, and may be implemented as one or more integrated circuits. Controller 405 is coupled to a Queue Memory 410 via address bus 412 and data bus 414. Controller 405 is also coupled to Datalink Memory 420 via address bus 422 and data bus 424. Finally, controller comprises a Free List Register Memory 430. The various components shown in FIG. 4 may be implemented as one or more integrated circuits. It should be noted that, as shown in FIG. 4, the hardware architecture depicted implies that only a single access to Queue Memory 410 can be performed at any given time. Similarly, one a single access to Datalink Memory 420 can be performed at any given time. Free List Register 430 is typically implemented as a register or as some other type of rapidly accessible memory, such that accesses to the Free List Register 430 are not considered to be costly in terms of total memory bandwidth. Nothing precludes the possibility that Free List Register 430 is implemented independently of controller 430, so long as Free List Register 430 can be accessed rapidly by controller 430.

Referring now to FIGS. 4 and 5, Queue Memory 410 comprises a set of Head and Tail pointers, with one Head pointer and one Tail pointer per queue. Each queue within Queue Memory 410 is typically implemented by associating the Head and Tail pointers of each queue with a set of data link information, which is a linked list memory structure (such as Datalink Memory 420) to maintain the stored data. Data Storage Memory 425 is the memory structure used to store the actual data elements. For the sake of explanation, an example is provided herein, with reference, to FIGS. 4–7.

In a typical queuing construct, a Queue Memory 410 records the Head and Tail information for the beginning and end positions of the queue. The data elements between the Head pointers are maintained in a linked list memory (e.g., Datalink memory 420 shown in FIGS. 4 and 5). As those of ordinary skill in the art will recognize, Datalink memory 420 provides the location of the next data element in the queue, while the actual data elements are stored in Data Storage Memory 425. In the example shown in FIG. 5, there are five data elements: a, b, c, d, and e. The Free pointer indicates the beginning ("head") of the remaining free link locations.

To receive a new data element, when a new data element arrives, the Queue Memory 410 is read to obtain the current Tail position (in this example, the value 101). The current Free location will be used to store the newly arriving data. Next, to establish the link, the current value of the Free pointer (103 in this example) is written to the Datalink Memory 420 at the current Tail position. This Free pointer value, which now is the new Tail pointer, is then written to the Tail record of Queue Memory 410. To obtain a new Free location, the current Free pointer is read to obtain the next available pointer (having a value of 105 in the example shown in FIG. 5). This value becomes the new Free pointer. Therefore, two memory access cycles are required for each of the Queue Memory 410 and the Datalink Memory 420 (for a total of four memory access cycles) when receiving a new data element.

A flow chart of the typical data element reception process just described is provided at FIG. 6. At step 610, Queue Memory 410 is read to obtain the current Tail pointer. At step 620, the value of the current Free pointer is written to Datalink Memory 620 at the current Tail pointer location. At step 630, Datalink memory 420 is read at the current Free pointer location to obtain the new Free pointer location. At step 640, the new Free pointer location is stored in Queue Memory 410 as the new Tail pointer. Finally, at step 650, the current Free pointer (stored in the Free List Register 439 shown in FIG. 4) is set to equal the new Free pointer. As mentioned earlier, step 650 is typically not very costly in terms of memory bandwidth, because the Free List Register 430 is typically implemented as a register or other rapidly accessible type of memory. Therefore, ignoring step 650, four memory access cycles are required to receive each data element: one Queue Memory read cycle, one Datalink Memory write cycle, one Datalink Memory read cycle, and one Queue Memory write cycle.

To transmit a data element, Queue Memory 410 is first read to obtain the current Head pointer (having a value of 2 in the example shown in FIG. 5). Datalink Memory 420 is read at this position to obtain the next data element after the Head pointer value is written at the current Head location. In the example shown in FIG. 5, the value 103 will be written to location 2. At this point, the new Head pointer (having a value of 5 in the example) is written back to the Queue Memory 410 Head record. Finally, the new Free pointer is set to the old Head position (having a value of 2 in the example). Thus, the old Head pointer is now "returned" to the Free link pointers. The Free pointers now start from location 2, then point to location 103, then to location 105, etc. Therefore, as the example illustrates, two memory access cycles are also required for each of the Queue Memory 410 and the Datalink Memory 420 (for a total of four memory access cycles) when transmitting a data element from the queue.

A flow chart of the typical data element transmission process just described is provided at FIG. 7. At step 710, Queue Memory 410 is read to obtain the old Head pointer value. At step 720, Datalink Memory 420 is read at the old Head pointer location to obtain the next data element location. At step 730, the Free pointer is written to the Datalink Memory 420 at the old Head pointer location. At step 740, the next data element location is stored in the Queue Memory 410 as the new Head pointer. Finally, at step 750 the Free pointer is set to equal the old Head pointer value. As was the case with step 650 shown in FIG. 6, step 750 is not considered to be very costly in terms of memory bandwidth. Therefore, ignoring step 750, the data element transmission process requires four memory access cycles: one Queue Memory read cycle, one Datalink Memory read cycle, one Datalink Memory write cycle, and one Queue Memory write cycle.

In summary, to completely process a data element (i.e., to receive a data element and to transmit a data element) in a typical queuing implementation, a total of four memory access cycles are required for each of the Queue Memory 410 and the Datalink Memory 420. This is illustrated in Table I, below.

TABLE 1

Typical Memory Access Requirements

|  | Field | Arrival | Departure | Total Access Cycles |
|---|---|---|---|---|
| Queue | Head & Tail | Read & Write | Read & Write | 4 |
| Data Link | Next Element | Read & Write | Read & Write | 4 |

As mentioned earlier, the number of memory accesses to the queue within a certain amount time is limited by the bandwidth of the memory. Therefore, reducing the number of memory access cycles required to process each data element would increase the data processing capability of a data network device such as a router. Unfortunately, no current mechanism exists to facilitate such a reduction in the number of memory access cycles required. As will be described in more detail below, the present invention provides a distributed queuing architecture that significantly reduces the number of memory access cycles required to process each data element.

According to aspects of the present invention, to reduce the number of memory access cycles required to process each data element, the queue and data link structures are implemented on separate memories. Instead of a single memory structure, a queue is maintained using separate Receive and Transmit Queues. Similarly, the data memory linked list is separated into a Data Queue Link and a Data Stack Link. Compared with existing approaches, the novel queuing structure according to aspects of the present invention reduces the number of required memory access cycles by half when processing a typical data element arrival and departure. It provides a scheme to more efficiently utilize the queuing memory bandwidth and to increase the data throughput. Moreover, the method is scalable and can be implemented for a large number of queues. These and other features and advantages of the present invention will be presented in more detail in the following specification of the invention and in the associated figures.

SUMMARY OF THE INVENTION

To reduce the number of memory access cycles required to process each data element in a data networking device having one or more queues and a corresponding set of data link structures, the queue and data link structures are implemented on separate memories. Each queue is maintained using separate receive and transmit queue structures. Similarly, the data memory linked list is separated into a data queue link and a data stack link. Each of these four memories comprises its own address and data bus, and all four memories may be accessed simultaneously by a controller. In a general case, processing a complete data transmission event (i.e., a data element arrival and a data element departure) may be performed with a latency of at most three steps. In the first step, the transmit queue is read to obtain the old head pointer. In the second step, the following three sub-steps are performed simultaneously: (1) the receive queue is read to obtain the current tail pointer, (2) the data stack link is read at the current free pointer position to obtain the new free pointer, and (3) the data queue link memory is read at the old head pointer address obtained in the first step to obtain the next data element location. The data values obtained from performing the first and second steps are used as either as addresses or data values in the third step. In the third step, the following four sub-steps may be performed simultaneously: (1) the free pointer is stored in the receive queue as the new tail pointer, (2) the next data element location is written to the transmit queue as the new head pointer, (3) the free pointer is stored in the data queue link memory at the current tail pointer location, (4) the free pointer is written to the data stack link memory at the old head pointer location. Various modifications to the above sequence of steps are possible.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to an implementation of the present invention as illustrated in the accompanying drawings. The same reference numbers will be used throughout the drawings and the following description to refer to the same or like parts.

Figure 1:
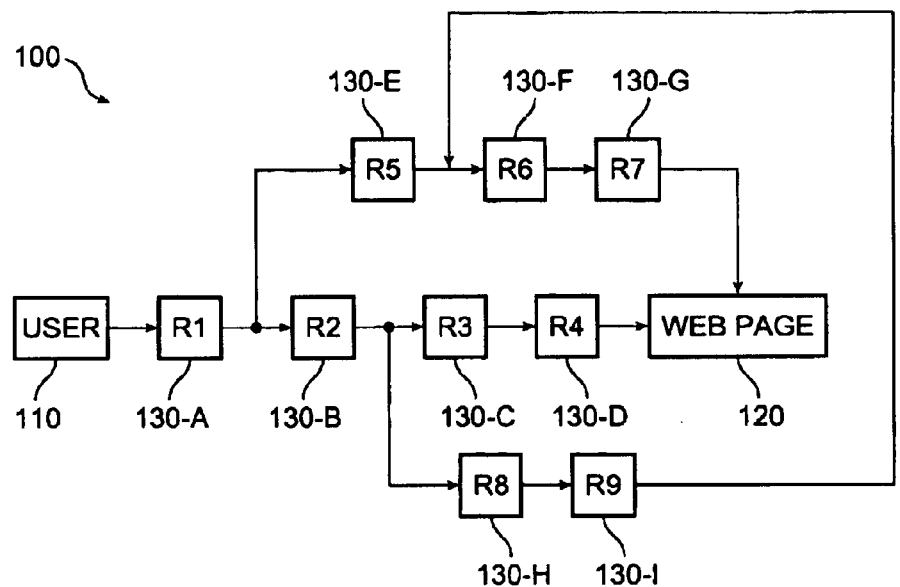
FIG. 1 is a block diagram illustrating an exemplary network connection between a user and a web page.
Figure 2:
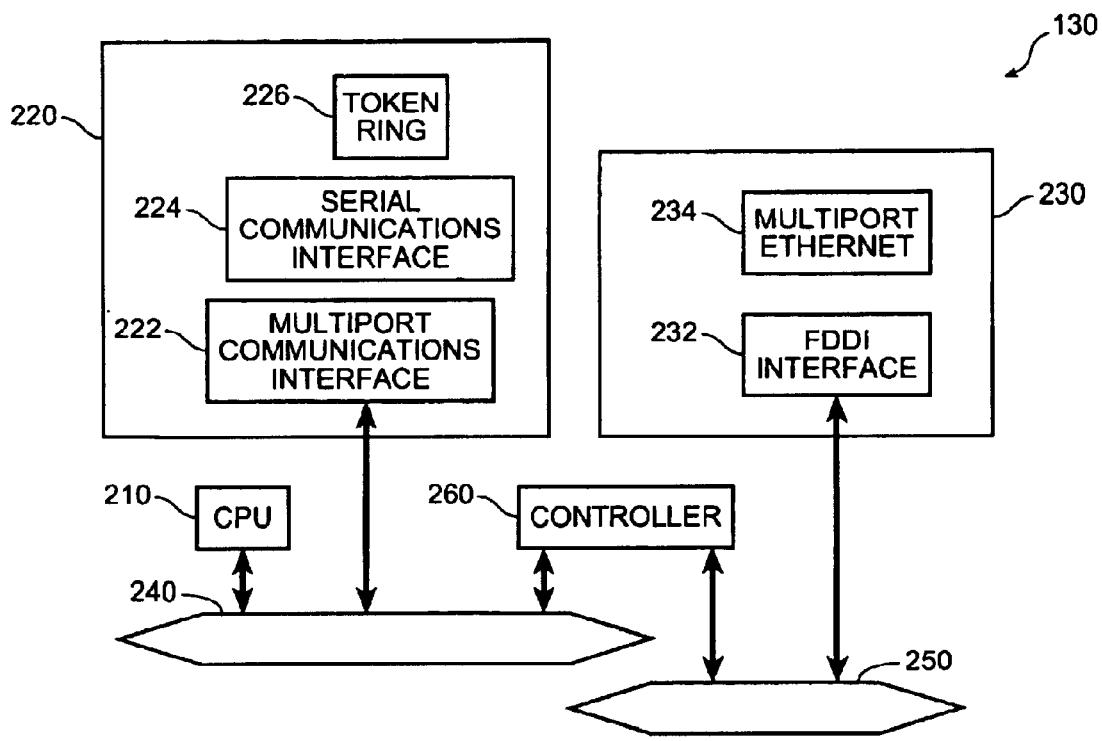
FIG. 2 is a block diagram of an exemplary router suitable for implementing an embodiment of the present invention.
Figure 3:
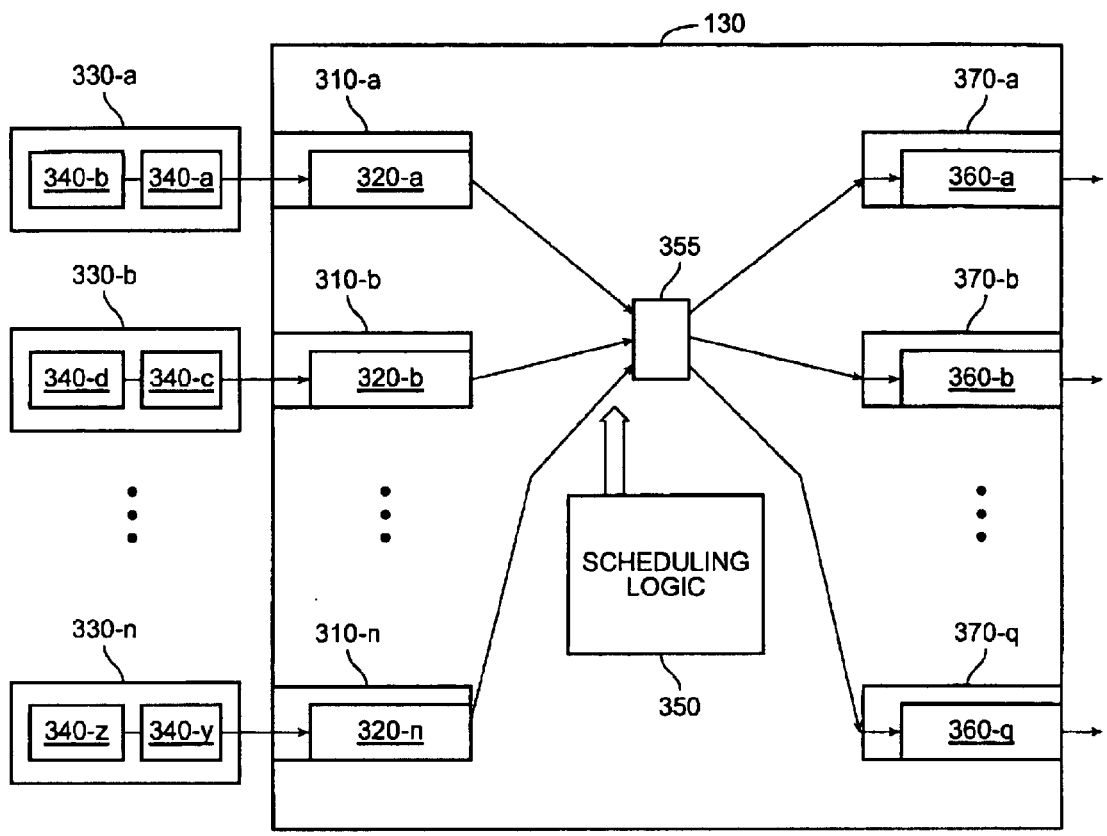
FIG. 3 is a block diagram illustrating a packet processing model in a typical router having multiple input interfaces and multiple output interfaces suitable for implementing an embodiment of the present invention.
Figure 4:
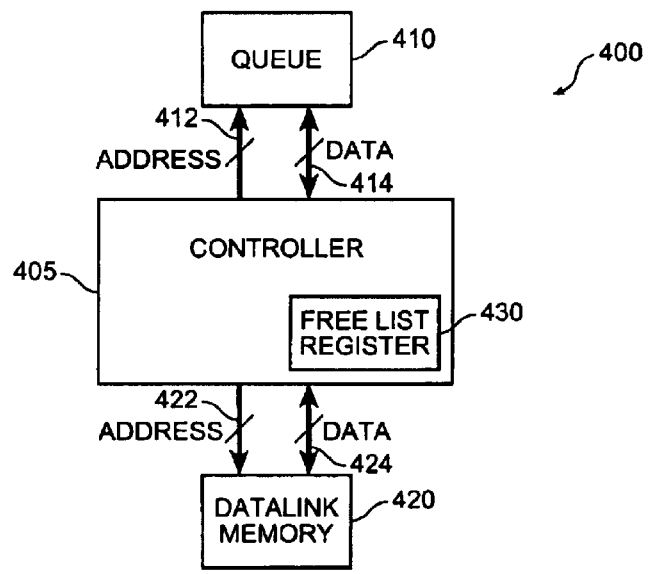
FIG. 4 is a block diagram illustrating a typical hardware architecture for a device implementing one or more queues.
Figure 5:
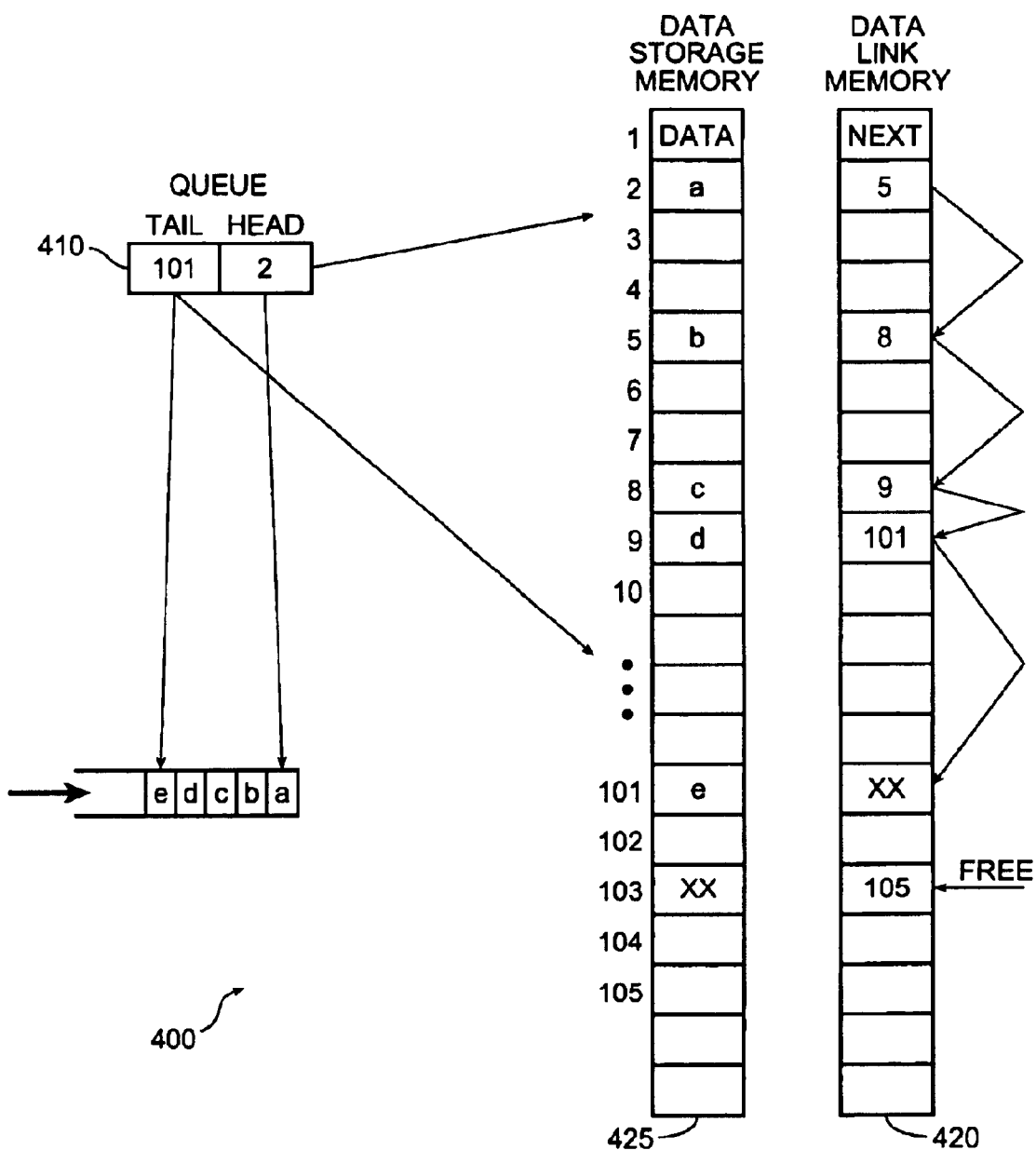
FIG. 5 illustrates an exemplary data element processing sequence in a typical queuing system using the hardware architecture shown in FIG. 4.
Figure 8:
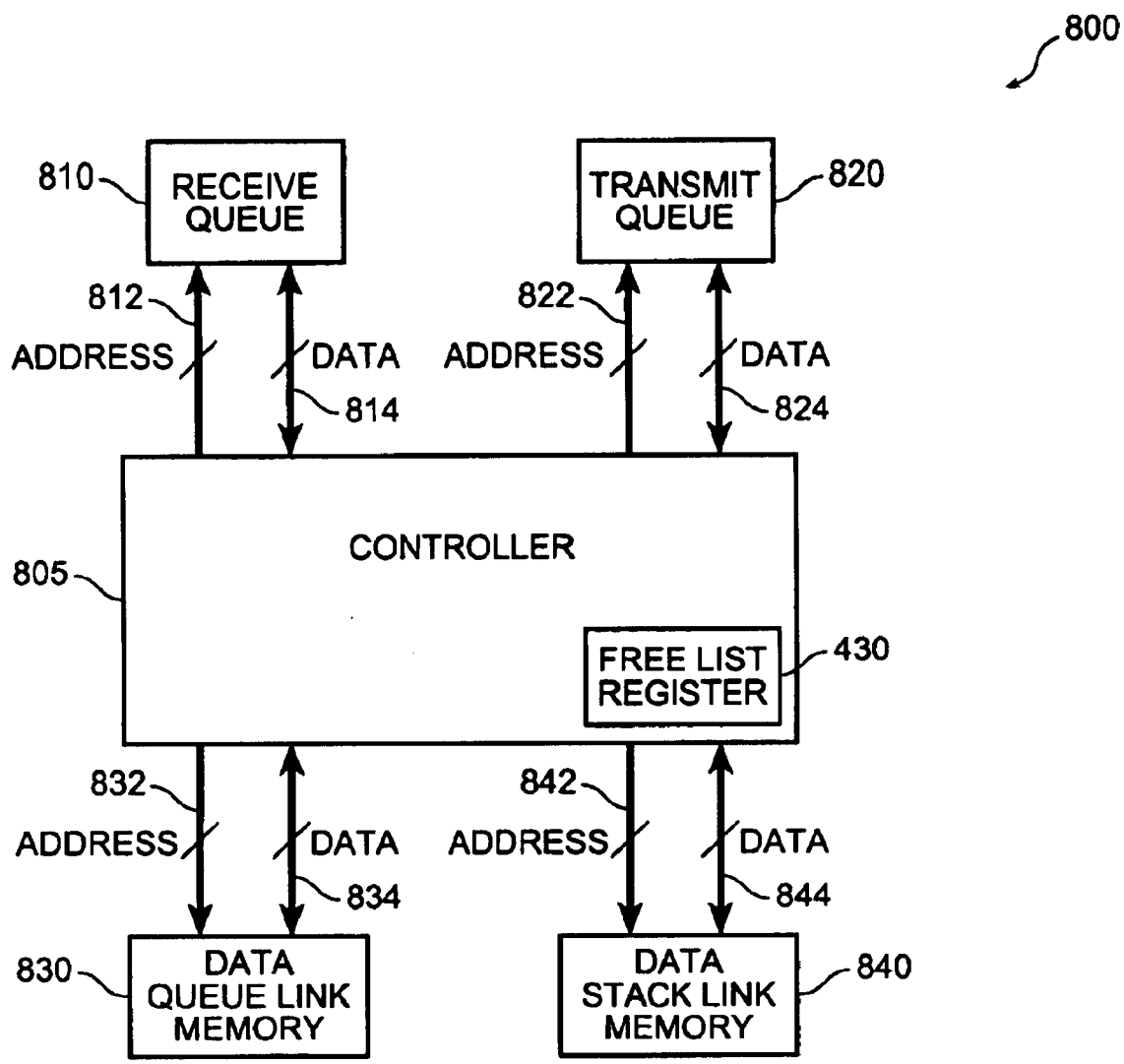
FIG. 8 is a block diagram illustrating a hardware architecture for an apparatus implementing one or more queues according to aspects of the present invention.

As shown in FIG. 8, to reduce the number of memory access cycles required to process each data element, the functions of the queue and data link structure are implemented on separate memories. Instead of a single queue memory structure (e.g., Queue Memory 410 shown in FIG. 4), the queue is implemented as having a Receive Queue 810 and a separate Transmit Queue 820. Similarly, the data memory linked list is separated into a Data Queue Link Memory 830 and a Data Stack Link Memory 840. Controller 805 is coupled to a Receive Queue Memory 810 via address bus 812 and data bus 814, and to Transmit Queue Memory 820 via address bus 822 and data bus 824. Controller 405 is also coupled to Data Queue Link Memory 830 via address bus 832 and data bus 834, and to Data Stack Link Memory 840 via address bus 842 and data bus 844. The structure and function of Free List Register 430 shown in FIG. 8 is equivalent to the corresponding element shown in FIG. 4 and described earlier.

Because each memory structure in the hardware architecture illustrated in FIG. 8 has its own address and data bus, memory structures 810, 820, 830, and 840 may all be accessed simultaneously. As will be discussed in more detail below, data dependencies are the only restriction on simultaneous memory access (i.e., a write operation cannot be performed on a memory structure before the data to be written to that memory structure is available).

Figure 9:
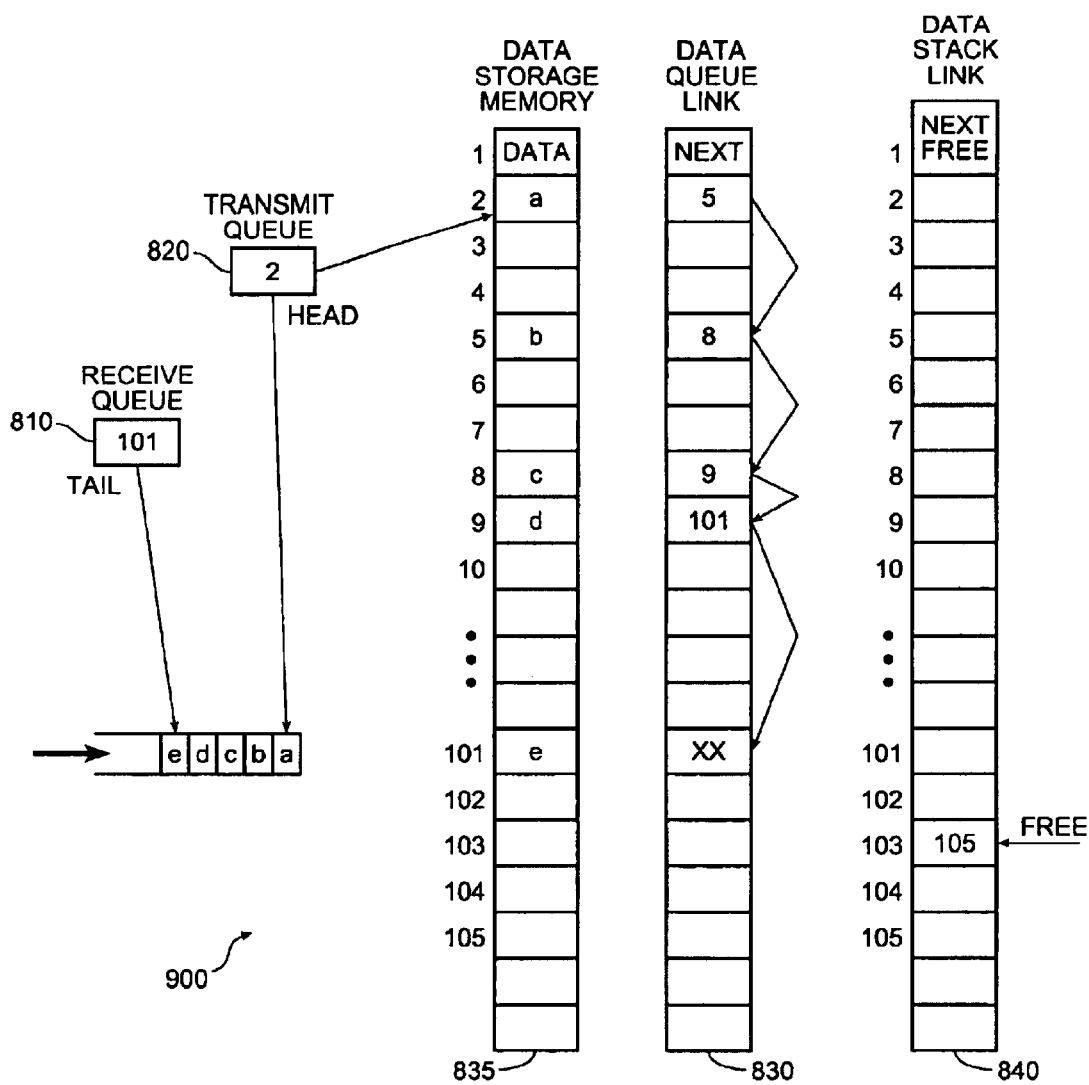
FIG. 9 illustrates an exemplary data element processing sequence in a queuing system using the hardware architecture shown in FIG. 8.

Referring now to FIG. 9, according to aspects of the present invention, when a data element arrives, the Receive Queue 810 is read to obtain the current Tail pointer, and the Data Stack Link Memory 840 is read to allocate an available location to store the data. The information is written to the Data Queue Link Memory 830 to maintain the link and to the Receive Queue 810 to record the new Tail pointer. If the queue is empty, the Tail pointer is copied to the Transmit Queue 820 as the Head pointer. In the case of a departing data element, the Transmit Queue 820 is read to obtain the Head pointer. The Data Queue Link Memory 830 is read for the next element in the queue as the new Head pointer, which is written to the Transmit Queue 820. Also, the location of the departing data element is written back to the Data Stack Link Memory 840. At that point, no operation is required on the Receive Queue 810. Since the Tail and Head pointers are not read at the same time, empty queue detection can be realized by using conventional monitoring logic (e.g., by keeping track of the number of elements in the queue). The actual data elements are stored in Data Storage Memory 835.

As will be discussed in more detail below, according to aspects of the present invention, the proposed distributed queuing structure significantly reduces the number of memory accesses required. In the distributed scheme according to aspects of the present invention, queuing is controlled by separate Receive Queues and Transmit Queues, and the data link is maintained by separate Data Queue Link and Data Stack Link memories. This architecture reduces the number of required access cycles for each memory and therefore increases the service throughput of the data.

As shown in Table II below, the total number of memory access cycles required for each memory structure has been reduced to two (half of the number required in Table I), with the exception of the Transmit Queue 820, which requires an additional write access cycle for initialization or when the queue is empty. However, this write access can be designed to be relatively insignificant across the total system bandwidth, since it only occurs when the queue is empty—indicating that the system has not utilized its full capacity.

TABLE 2

Distributed Queue Access

| | Field | Arrival | Departure | Total Access |
|---|---|---|---|---|
| Receive Queue | Tail | Read & Write | — | 2 |
| Transmit Queue | Head | (Write) | Read & Write | (1) + 2 |
| Data Stack Link | Next Free | Read | Write | 2 |
| Data Queue Link | Next Element | Write | Read | 2 |

Figure 6:
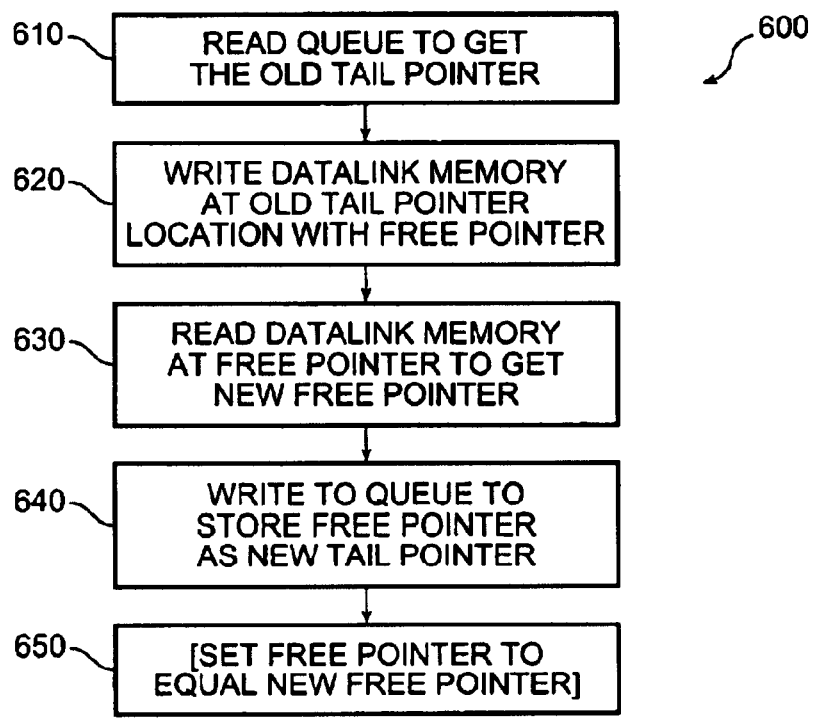
FIG. 6 is a flow chart illustrating a data element arrival process in a typical queuing system using the hardware architecture shown in FIG. 4.
Figure 10:
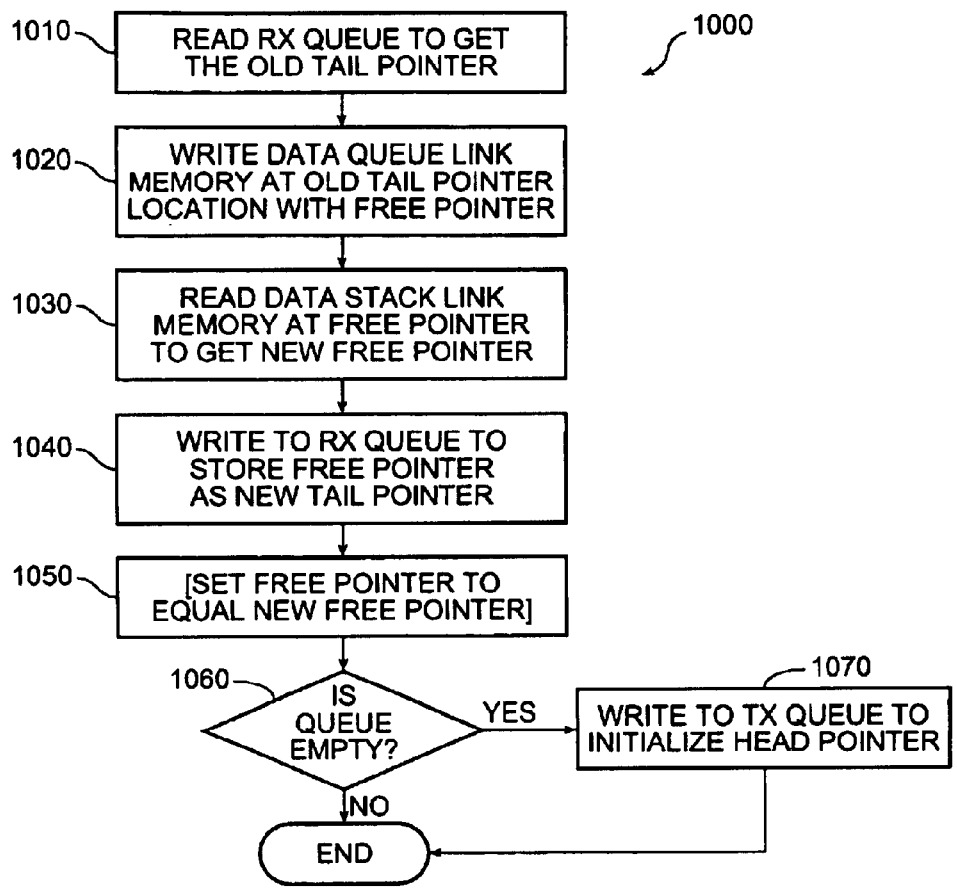
FIG. 10 is a flow chart illustrating a data element arrival process in a queuing system using the hardware architecture shown in FIG. 8.

A flow chart illustrating a data element reception (i.e., "arrival") process according to aspects of the present invention is provided at FIG. 10. At step 1010, Receive Queue Memory 810 is read to obtain the current Tail pointer. At step 1020, the value of the current Free pointer is written to the Data Queue Link Memory 830 at the current Tail pointer location. At step 1030, the Data Stack Link Memory 840 is read at the current Free pointer location to obtain the new Free pointer location. At step 1040, the new Free pointer location is written to the Receive Queue Memory 810 as the new Tail pointer. At step 1050, the Free pointer is set to equal the new Free pointer location. As was the case with step 650 shown in FIG. 6, step 1050 is not very costly in terms of memory bandwidth, because the Free List Register 430 of FIG. 8 is typically implemented as a register or other rapidly accessible type of memory.

Still referring to FIG. 10, at step 1060, a decision is made depending on whether the Receive Queue is empty. If so, then the Transmit Queue Memory 820 is written to initialize the Head pointer.

A key observation according to aspects of the present invention is that steps 1010 and 1030 can be performed simultaneously, because there are no data dependencies between those steps, and because the hardware architecture (as shown in FIG. 8) permits simultaneous access to the memory structures involved in those steps. For the same reasons, steps 1020 and 1040 can also be performed simultaneously (after the execution of steps 1010 and 1030). An optimization that can be made according to aspects of the present invention based on this observation will be described later.

Figure 11:
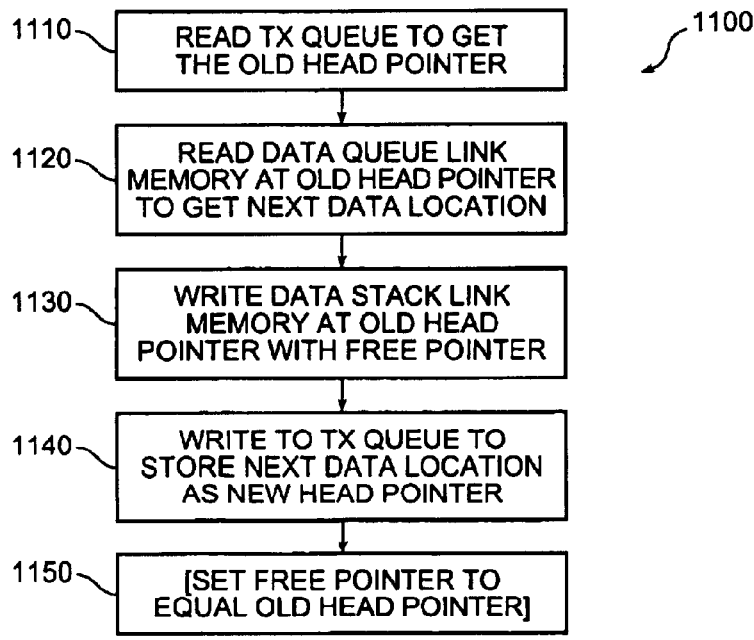
FIG. 11 is a flow chart illustrating a data element departure process in a queuing system using the hardware architecture shown in FIG. 8.

A flow chart illustrating a data element transmission process according to aspects of the present invention is provided at FIG. 11. At step 1110, Transmit Queue Memory 820 is read to obtain the old Head pointer value. At step 1120, Data Queue Link Memory 830 is read at the current Head pointer location to obtain the next data element location.

Figure 7:
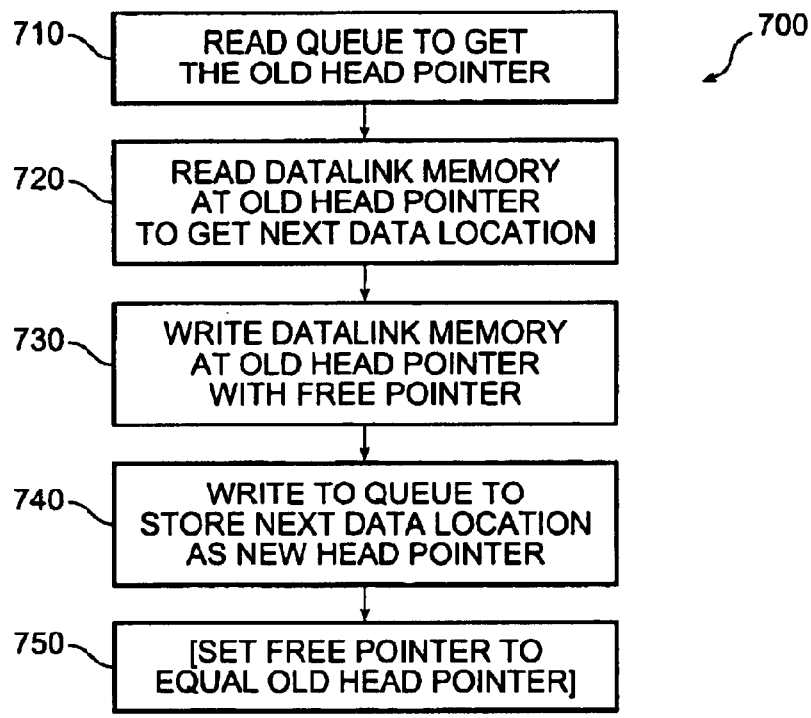
FIG. 7 is a flow chart illustrating a data element departure process in a typical queuing system using the hardware architecture shown in FIG. 4.

At step 1130, the Free pointer is written to the Data Stack Link Memory 840 at the old Head pointer location. At step 1140, the next data element location is written to the Transmit Queue Memory 820 as the new Head pointer. Finally, at step 1150 the Free pointer is set to equal the old Head pointer value. As was the case with step 750 shown in FIG. 7, step 1150 is not considered to be very costly in terms of memory bandwidth.

Another key observation according to aspects of the present invention is that steps 1120 and 1120 can be performed simultaneously, because there are no data dependencies between those steps, and because the hardware architecture (as shown in FIG. 8) permits simultaneous access to the memory structures involved in those steps. Alternatively, steps 1130 and 1140 may be performed simultaneously. The only dependencies in the flow chart illustrated in FIG. 11 are that step 1110 must be performed before steps 1120 and 1130, and that step 1120 must be performed before step 1140. A further optimization that can be made according to aspects of the present invention based on this observation is described next.

Figure 12:
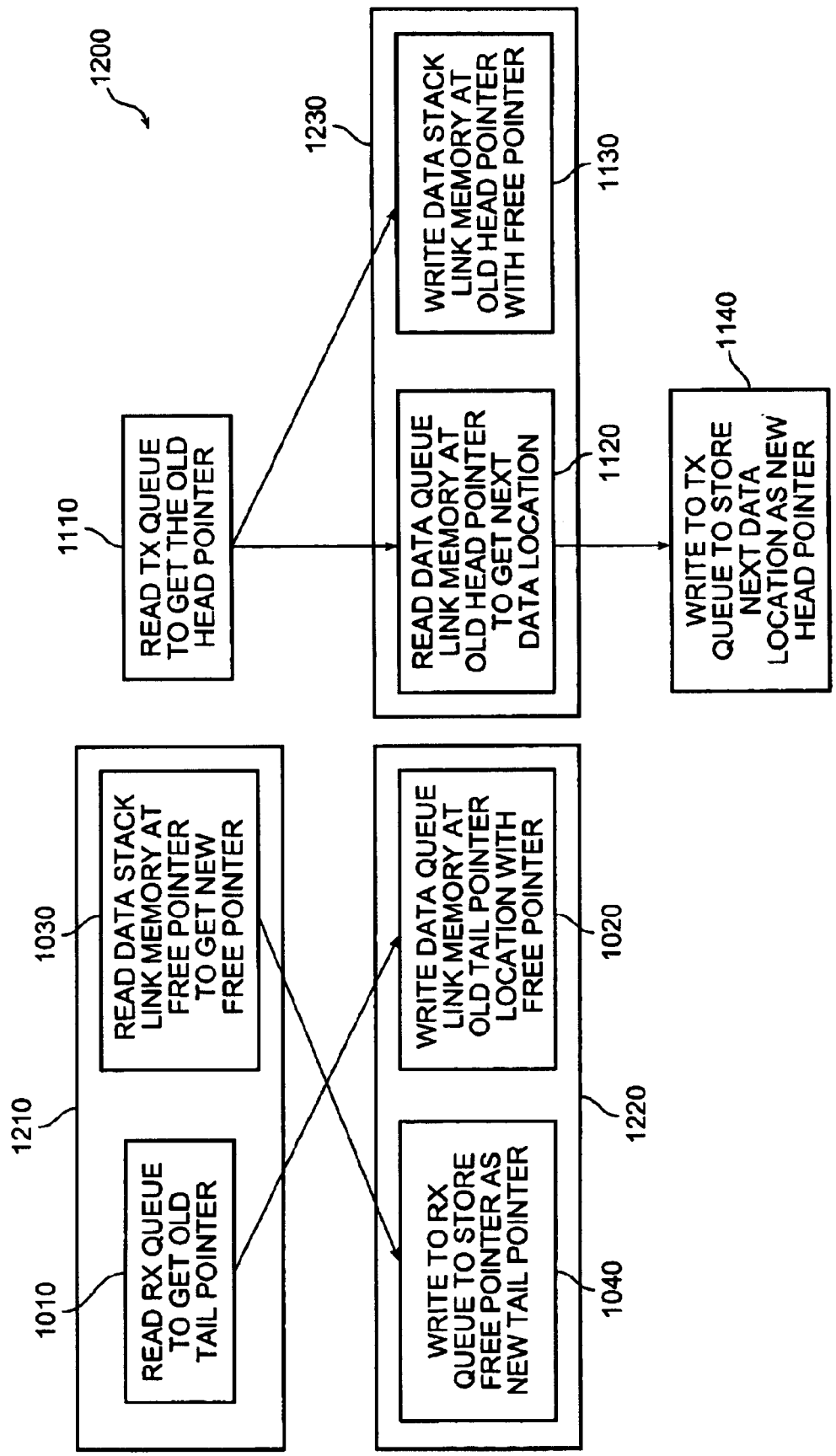
FIG. 12 is a flow chart illustrating the reduction of memory access cycles required to process the arrival and departure of a data element that is facilitated by aspects of the present invention.

FIG. 12 is a flow chart illustrating the reduction of memory access cycles for processing the arrival and departure of a data element that is facilitated by aspects of the present invention. FIG. 12 illustrates the data dependencies between the principal steps shown in FIGS. 10 and 11. It should be noted that the FIG. 12 does not take into account the case when a queue is empty and the first data element is received. As mentioned earlier, this case requires an additional memory cycle to the Transmit Memory Queue 820 to copy the Head pointer to the Tail pointer.

Still referring to FIG. 12, steps 1010 and 1030 (on the "receive" side) may be performed simultaneously (shown grouped into step 1210 in FIG. 12), and both of these steps may even be performed simultaneously with step 1110 on the "transmit" side. Once steps 1010, 1030, and 1110 have been performed, then steps 1040, 1020, 1120, and 1130 may be performed. Step 1140 is the only step that cannot be performed as soon as steps 1210 and 1110 are performed. In FIG. 12, steps 1040 and 1020 on the "receive" side are shown as grouped into step 1220, and steps 1120 and 1130 on the "transmit" side are shown as grouped into step 1230. It should be noted, however, that steps 1040, 1020, 1120, and 1130 may not all be performed simultaneously. This is because steps 1020 and 1120 both reference the same memory structure (i.e., Data Queue Link memory 830).

Figure 13:
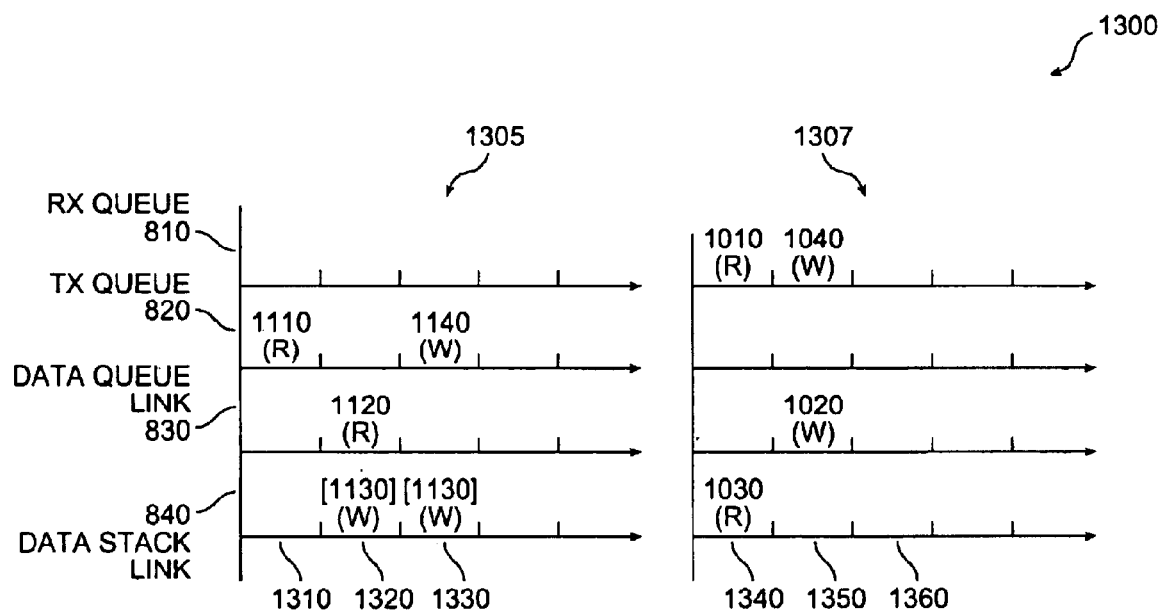
FIG. 13 is a diagram illustrating an exemplary data element arrival processing time line and an exemplary data element departure processing time line according to aspects of the present invention.

FIG. 13 is a diagram illustrating an exemplary data element arrival processing time line 1305 and an exemplary data element departure processing time line 1307 according to aspects of the present invention. As shown in FIG. 13, the complete time line 1300 has been separated into a data element arrival processing time line 1305 and a data element departure processing time line 1307. The principal steps shown in FIGS. 10–12 and described earlier have been arranged into specific time slots 1310–1360. Conceptually, each time slot 1310–1360 represents a single memory access cycle.

Within data element arrival processing time line 1305, there are three "receive" time slots 1310–1330. In the first "receive" time slot 1310, step 1110 is performed (a read operation on the Transmit Queue 820). In the second "receive" time slot 1320, step 1120 is performed (a read operation on the Data Queue Link 830), and step 1130 may also be performed simultaneously (a write operation on the Data Stack Link 840). Step 1130 is shown as surrounded in square brackets in FIG. 13, because it can also be performed in the third "receive" time slot 1330 (or in any time slot that occurs after step 1110 has been performed). In the third "receive" time slot 1330, step 1130 is performed if it has not already been performed in the second "receive" time slot 1320, and step 1140 is also performed (a write operation on the Transmit Queue 820).

Still referring to FIG. 13, within data element departure processing time line 1307, there are three "transmit" time slots 1340–1360, but only the first "transmit" time slot 1340 and the second "transmit" time slot 1350 are needed. In the first "transmit" time slot 1340, step 1010 is performed (a read operation on the Receive Queue 810), and step 1030 (a read operation on the Data Stack Link 840) is simultaneously performed. In the second "transmit" time slot 1350, step 1040 is performed (a write operation on the Receive Queue 810), and step 1020 (a write operation on the Data Queue Link 830) is simultaneously performed.

Figure 14:
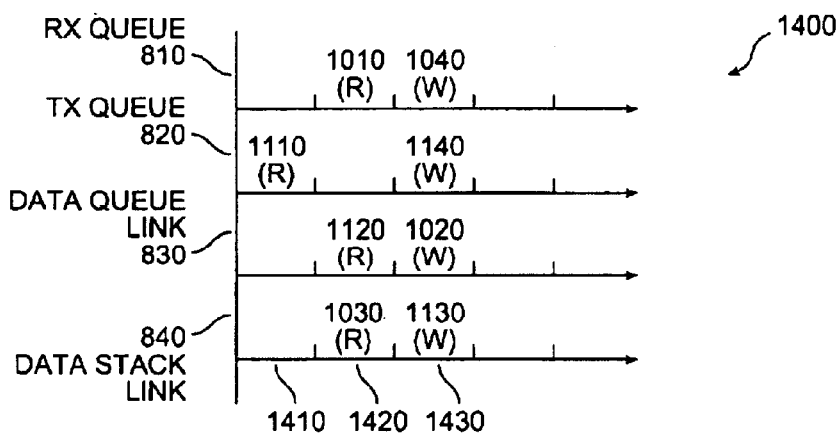
FIG. 14 is a diagram illustrating an exemplary combined data element arrival and departure processing time line according to aspects of the present invention.

FIG. 14 is a diagram illustrating an exemplary combined data element arrival and departure processing time line 1400 according to aspects of the present invention. FIG. 14 illustrates one exemplary method for exploiting the parallelism facilitated by the present invention. In FIG. 14, the principal steps shown in FIGS. 10–12 and described earlier have been arranged into three combined time slots 1410–1430. As in FIG. 13, each time slot 1410–1430 shown in FIG. 14 represents a single memory access cycle.

In the first time slot 1410, step 1110 is performed (a read operation on the Transmit Queue 820). In the second time slot 1420, step 1010 is performed (a read operation on the Receive Queue 810), along with step 1120 (a read operation on the Data Queue Link 830), and step 1030 (a read operation on the Data Stack Link 840). In the third time slot 1430, step 1040 is performed (a write operation on the Receive Queue 810), along with step 1140 (a write operation on the Transmit Queue 820), step 1020 (a write operation on the Data Queue Link 830), and step 1130 (a write operation on the Data Stack Link 840). Those of ordinary skill in the art will recognize that other arrangements and sequences of steps may be implemented within the scope of the present invention, and that pipelining techniques may be employed to further exploit the time slots illustrated as "empty" in FIG. 14.

In summary, the queuing structure according to aspects of the present invention significantly reduces the number of memory access cycles required to process a typical data arrival and departure. It provides a scalable scheme to more efficiently utilize the queuing memory bandwidth and to increase the data throughput, and can be implemented in devices having a large number of queues.

As mentioned earlier, the techniques described herein according to aspects of the present invention may be implemented in routers or in any device having a plurality of output interfaces that forwards incoming data to one or more of these output interfaces. As is known to those of ordinary skill in the art, the program code which may be required to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. An apparatus for processing data element arrival and departure events in a data networking device, comprising:

a controller comprising a free list register accessible by said controller;

a receive queue memory coupled to said controller via a first address bus and a first data bus;

a transmit queue memory coupled to said controller via a second address bus and a second data bus;

a data queue link memory coupled to said controller via a third address bus and a third data bus; and a data stack link memory coupled to said controller via a fourth address bus and a fourth data bus.

2. The apparatus of claim 1, wherein said data networking device is a router.

3. The apparatus of claim 1, wherein said data networking device is an Asynchronous Transfer Mode ("ATM") switch.

4. A method for processing a data element arrival event in a data networking device having a controller comprising a free list register accessible by said controller, a receive queue memory coupled to said controller via a first address bus and a first data bus, a data queue link memory coupled to said controller via a second address bus and a second data bus, and a data stack link memory coupled to said controller via a third address bus and a third data bus, the method comprising:

reading said receive queue memory to obtain a current tail pointer;

storing a current free pointer value obtained from said free list register into said data queue link memory at an address corresponding to said current tail pointer;

reading said data stack link memory at an address corresponding to said current free pointer value to obtain a new free pointer value; and storing said new pointer value as a new tail pointer value in said receive queue memory.

5. The method of claim 4, wherein said data networking device is a router.

6. The method of claim 4, wherein said data networking device is an Asynchronous Transfer Mode ("ATM") switch.

7. The method of claim 4, further comprising the step of storing an initial head pointer value into a transmit queue memory coupled to said controller via a fourth address bus and a fourth data bus if said receive queue memory is empty.

8. The method of claim 7, wherein said data networking device is a router.

9. The method of claim 7, wherein said data networking device is an Asynchronous Transfer Mode ("ATM") switch.

10. The method according to claim 4, wherein the steps of reading said receive queue memory to obtain a current tail pointer and of reading said data stack link memory at an address corresponding to a current free pointer value obtained from said free list register to obtain a new free pointer value are performed substantially simultaneously.

11. The method according to claim 10, wherein the steps of storing said new pointer value as a new tail pointer value in said receive queue memory and of storing a current free pointer value obtained from said free list register into said data queue link memory at an address corresponding to said current tail pointer are also performed substantially simultaneously.

12. The method according to claim 4, wherein the steps of storing said new pointer value as a new tail pointer value in said receive queue memory and of storing a current free pointer value obtained from said free list register into said data queue link memory at an address corresponding to said current tail pointer are performed substantially simultaneously.

13. An apparatus for processing a data element arrival event in a data networking device having a controller comprising a free list register accessible by said controller, a receive queue memory coupled to said controller via a first address bus and a first data bus, a data queue link memory coupled to said controller via a second address bus and a second data bus, and a data stack link memory coupled to said controller via a third address bus and a third data bus, the apparatus comprising:

means for reading said receive queue memory to obtain a current tail pointer;

means for storing a current free pointer value obtained from said free list register into said data queue link memory at an address corresponding to said current tail pointer;

means for reading said data stack link memory at an address corresponding to said current free pointer value to obtain a new free pointer value; and means for storing said new-pointer value as a new tail pointer value in said receive queue memory.

14. The apparatus of claim 13, wherein said data networking device is a router.

15. The apparatus of claim 13, wherein said data networking device is an Asynchronous Transfer Mode ("ATM") switch.

16. The apparatus of claim 13, further comprising means for storing an initial head pointer value into a transmit queue memory coupled to said controller via a fourth address bus and a fourth data bus if said receive queue memory is empty.

17. The apparatus of claim 16, wherein said data networking device is a router.

18. The apparatus of claim 16, wherein said data networking device is an Asynchronous Transfer Mode ("ATM") switch.

19. A method for processing a data departure event in a data networking device having a controller comprising a free list register accessible by said controller, a transmit queue memory coupled to said controller via a first address bus and a first data bus, a data queue link memory coupled to said controller via a second address bus and a second data bus, and a data stack link memory coupled to said controller via a third address bus and a third data bus, the method comprising:

reading said transmit queue memory to obtain a current head pointer value;

reading said data queue link memory at an address corresponding to said current head pointer value to obtain a next data element location;

storing a free pointer value obtained from reading said free list register into said data stack link memory at an address corresponding to said current head pointer value;

storing said next data element location into said transmit queue as a new head pointer value; and storing said current head pointer value into said free list register.

20. The method of claim 19, wherein said data networking device is a router.

21. The method of claim 19, wherein said data networking device is an Asynchronous Transfer Mode ("ATM") switch.

22. A method for processing a combined data arrival and data departure event in a data networking device having a controller comprising a free list register accessible by said controller, a receive queue memory coupled to said controller via a first address bus and a first data bus, a transmit queue memory coupled to said controller via a second address bus and a second data bus, a data queue link memory coupled to said controller via a third address bus and a third data bus, and a data stack link memory coupled to said controller via a fourth address bus and a fourth data bus, the method comprising:

reading said transmit queue memory to obtain a current head pointer value;

reading said receive queue memory to obtain a current tail pointer while substantially simultaneously reading said data stack link is read at a current free pointer value obtained from said free list register to obtain the new free pointer value and reading said data queue link memory at an address corresponding to said current head pointer value; and storing said new free pointer value into said receive queue memory as a new tail pointer value while substantially simultaneously storing a next data element location into said transmit queue memory as a new head pointer value, storing said new free pointer value into said data queue link memory at an address corresponding to said current tail pointer value, and storing said new free pointer value into said data stack link memory at an address corresponding to said current head pointer value.

23. The method of claim 22, wherein said data networking device is a router.

24. The method of claim 22, wherein said data networking device is an Asynchronous Transfer Mode ("ATM") switch.

25. A program storage device readable by a machine, tangibly embodying a program of instructions executable by the machine to perform a method for processing a data element arrival event in a data networking device having a controller comprising a free list register accessible by said controller, a receive queue memory coupled to said controller via a first address bus and a first data bus, a data queue link memory coupled to said controller via a second address bus and a second data bus, and a data stack link memory coupled to said controller via a third address bus and a third data bus, the method comprising:

reading said receive queue memory to obtain a current tail pointer;

storing a current free pointer value obtained from said free list register into said data queue link memory at an address corresponding to said current tail pointer;

reading said data stack link memory at an address corresponding to said current free pointer value to obtain a new free pointer value; and storing said new pointer value as a new tail pointer value in said receive queue memory.

26. A program storage device readable by a machine, tangibly embodying a program of instructions executable by the machine to perform a method for processing a data departure event in a data networking device having a controller comprising a free list register accessible by said controller, a transmit queue memory coupled to said controller via a first address bus and a first data bus, a data queue link memory coupled to said controller via a second address bus and a second data bus, and a data stack link memory coupled to said controller via a third address bus and a third data bus, the method comprising:

reading said transmit queue memory to obtain a current head pointer value;

reading said data queue link memory at an address corresponding to said current head pointer value to obtain a next data element location;

storing a free pointer value obtained from reading said free list register into said data stack link memory at an address corresponding to said current head pointer value;

storing said next data element location into said transmit queue as a new head pointer value; and storing said current head pointer value into said free list register.

27. A program storage device readable by a machine, tangibly embodying a program of instructions executable by the machine to perform a method for processing a combined data arrival and data departure event in a data networking device having a controller comprising a free list register accessible by said controller, a receive queue memory coupled to said controller via a first address bus and a first data bus, a transmit queue memory coupled to said controller via a second address bus and a second data bus, a data queue link memory coupled to said controller via a third address bus and a third data bus, and a data stack link memory coupled to said controller via a fourth address bus and a fourth data bus, the method comprising:

reading said transmit queue memory to obtain a current head pointer value;

reading said receive queue memory to obtain a current tail pointer while substantially simultaneously reading said data stack link is read at a current free pointer value obtained from said free list register to obtain the new free pointer value and reading said data queue link memory at an address corresponding to said current head pointer value; and storing said new free pointer value into said receive queue memory as a new tail pointer value while substantially simultaneously storing a next data element location into said transmit queue memory as a new head pointer value, storing said new free pointer value into said data queue link memory at an address corresponding to said current tail pointer value, and storing said new free pointer value into said data stack link memory at an address corresponding to said current head pointer value.

* * * * *